L. MATTSON.
HAY FORK.
APPLICATION FILED FEB. 21, 1919.
1,317,882.
Patented Oct. 7, 1919.
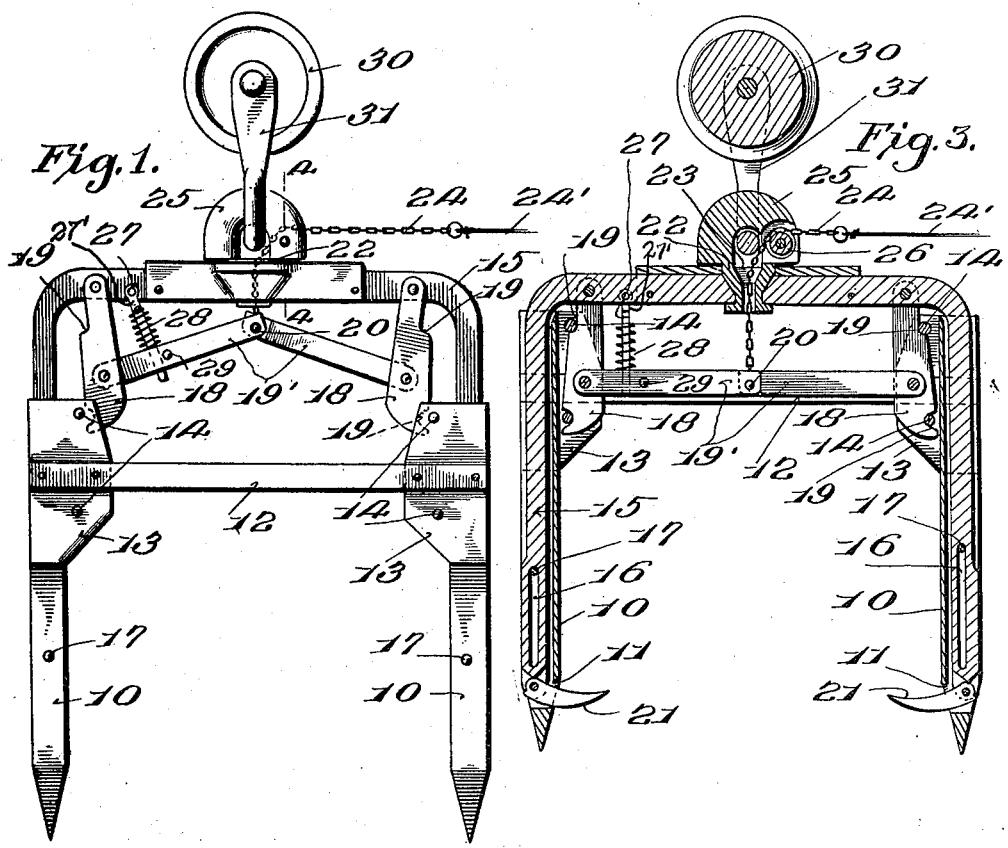
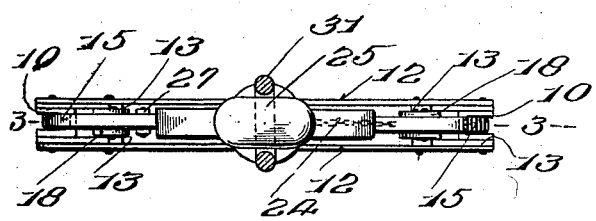
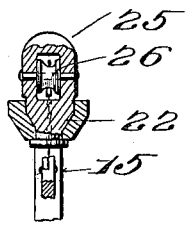

UNITED STATES PATENT OFFICE.

LAWRENCE MATTSON, OF STANCHFIELD, MINNESOTA.

HAY-FORK.

1,317,882.     Specification of Letters Patent.     Patented Oct. 7, 1919.

Application filed February 21, 1919. Serial No. 278,463.

*To all whom it may concern:*

Be it known that I, LAWRENCE MATTSON, a citizen of the United States, residing at Stanchfield, in the county of Isanti, State of Minnesota, have invented certain new and useful Improvements in Hay-Forks; and I do hereby declare the following to be a full, clear, and exact description of the invention, such as will enable others skilled in the art to which it appertains to make and use the same.

This invention relates to new and useful improvements in hay forks and particularly to the hay forks which are adapted to carry hay from a wagon into the barn.

One object of the present invention is to provide a novel and improved device of this character which is simple in construction and easy and effective in its operation.

Another object of the present invention is to provide a hay fork which includes novel and efficient means for locking the movable hay gripping members in open or closed position.

A further object is to so locate the trip rope or chain that danger of the same becoming entangled with the fork when said fork turns on the carrying rope or track, is obviated.

Other objects and advantages will be apparent from the following description when taken in connection with the accompanying drawing.

In the drawing:

Figure 1 is an elevation of the hay fork in position for entrance into the hay.

Fig. 2 is a top plan view of the same.

Fig. 3 is a vertical sectional view taken on the line 3—3 of Fig. 2, the pivoted members being extended for gripping the hay.

Fig. 4 is a vertical sectional view taken on the line 4—4 of Fig. 1.

Referring particularly to the accompanying drawing 10 represents a pair of parallel tines which are preferably channel in shape with the open portion disposed outwardly, and the lower portion of the inner wall formed with an opening 11. A pair of parallel bars 12 are secured to and extend between the upper ends of the tines to hold them in proper spaced relation. A pair of plates 13 is secured to the upper end of each tine and extend inwardly, as shown, and extending between the upper and lower ends of each pair of plates is a pin 14. A yoke member 15 has its arms disposed for vertical slidable movement in the channels of the tines, and formed in the lower portion of each arm of the yoke is a longitudinal slot 16 through which extends a pin 17, carried by the tine, and which limits the upward and downward movements of the yoke. Pivotally suspended from each end of the transverse portion of the yoke is a detent member 18 having a pair of notches 19 for the reception of the pins 14. Pivotally connected to each of the members 18 is an inwardly extending link 19' the inner ends of which are connected pivotally at 20. These links, when moved downwardly into horizontal position, press the members 18 outwardly so that either the upper or lower pins 14 will be engaged in the notches of said members, whereby the yoke will be held in either elevated or lowered position, and the pivoted tine members 21, which are carried by the lower ends of the arms of the yoke, held in operative position through the openings 11. Rotatably mounted in the central portion of the transverse member of the yoke is a swivel block 22, vertically through which is formed an opening 23 for the passage of the chain 24 which is connected at its lower end to the inner ends of the links 19. The other end of the chain is connected with the trip rope 24', which is operable by the man on the wagon, to break the joint of the links and release the members 18 from the pins 14, and thus permit the downward movement of the tines and withdrawal of the members 21 into the channels, with the result that the hay will be released and drop from the fork. A housing 25 is mounted on the transverse member of the yoke over the upper end of the swivel block, and mounted in this housing is a pulley 26 over which the chain passes. Pivotally mounted on the transverse member of the yoke, and depending therefrom, is a member 27, and engaged around this member or pin is a coil spring 28, the upper end bearing against a stop 27' carried by the member 27 while the lower end bears against the adjacent link 19. A pin 29 is disposed to extend laterally from the link to prevent the pin member 27 from swinging toward the central joint of the links. This spring serves to hold the links in their horizontal position, so that the members 18 will be held with their notches receiving the pins 14, and the arms of the yoke prevented from movement out of operative or inoperative position until released by a pull on the chain.

Particularly is the attention called to the fact that the chain passes vertically through the swivel block whereby all danger of twisting of the chain around the upper portion of the fork is prevented. It will also be noted that the point of suspension of the device is on the yoke and the pivoted pointed members 21, whereby when the chain is pulled to release the members 18 from the pins 14, the weight of the hay will swing the members 21 downwardly and permit the hay to easily and quickly slip from the tines. Thus the movement of the members 21 will be downwardly, under the weight of the hay, the arms of the yoke moving upwardly to withdraw the members 21 within the tines. Thus a jarring action is produced on the tines which will more easily and quickly release the hay from the tines than with similar devices heretofore.

A pulley 30 is carried by the upper end of the yoke 31 for engagement with the rope from a block and tackle of an elevated carrier. (Not shown.) Thus should the fork tend to turn or twist while moving to or from the wagon of hay, the swivel block will remain stationary and permit the remainder of the fork to turn, with the result that the chain or trip rope will not wind or twist on the upper portion of the fork.

The parts are normally in the position shown in Fig. 1 when the fork is forced into the mass of hay to be lifted. When the fork has been properly engaged in the hay the channeled tines are drawn upwardly so as to cause the members 21 to project and engage with the hay so that the load will be supported on the tines when the fork is elevated. The parts are then locked in such position by forcing downwardly the links 19' and engaging the notched members 18 with the pins 14. The load can be lifted and conveyed to the point of dumping, when a pull on the chain 24', by the operator will lift the joint of the links 19' so as to break said joint, thus permitting the load of hay to bear downwardly on the members 21, with the result that said members will be forced to withdraw within the channeled tines, thus allowing the load of hay to slip downwardly from the tines. Also, as the hay slides from the tines the tines 15 will move upwardly, while the tines 10 will move downwardly, thus facilitating the release of the load of hay from the fork.

What is claimed is:

A hay fork including a pair of hollow tines having openings therethrough, a vertically slidable yoke member having its arms disposed in the tines, pivoted hay gripping members carried by the lower ends of the arms and movable through said openings, a suspending means for the yoke, a swiveled connection between the yoke and the suspending means, depending tine engaging members carried by the yoke, locking links connected to the depending members and to each other, guiding means for the arms of the yoke, and trip means connected to the links and disposed through the swiveled connection.

In testimony whereof I affix my signature in the presence of two witnesses.

LAWRENCE MATTSON.

Witnesses:
    FRED C. FALK,
    JOHN M. MATTSON.